Figure 1:
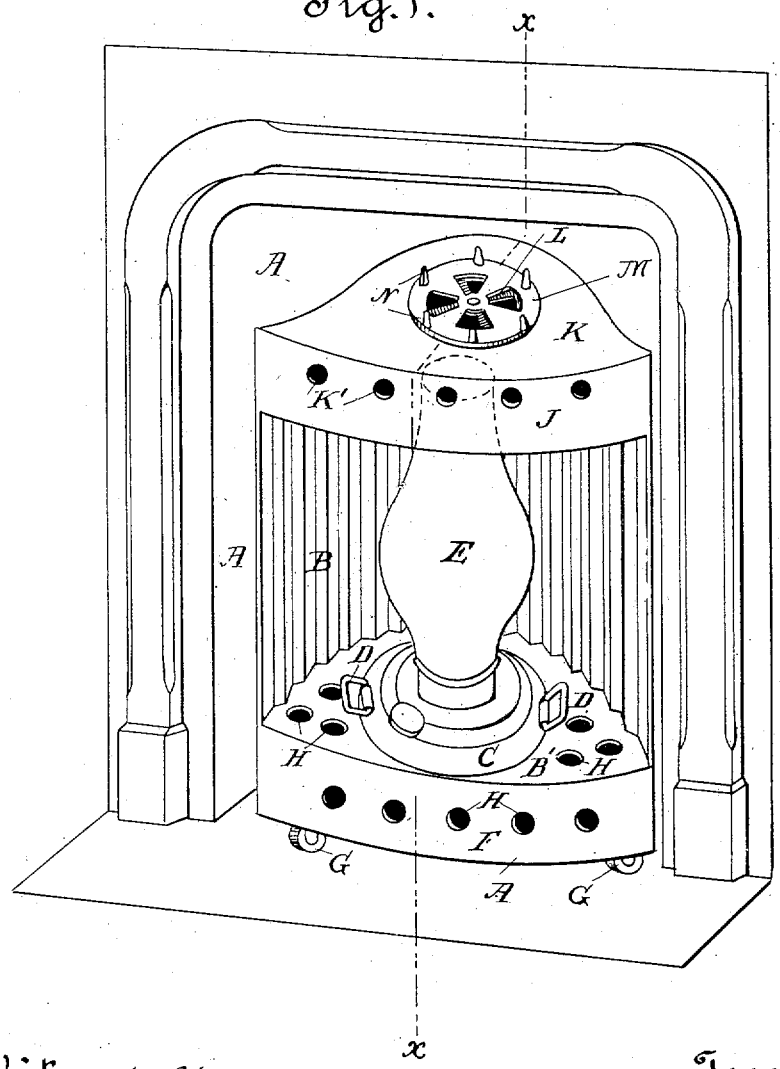

2 Sheets—Sheet 1.

J. F. MYERS.

STOVE FOR HEATING AND LIGHTING PURPOSES.

No. 11,383. Reissued Nov. 7, 1893.

Witnesses.

H. Montieverde

A. S. Pare

Inventor

John F. Myers by J. M. E. Boone his attorney

THE NORRIS PETERS CO., PHOTO-LITHO., WASHINGTON, D. C.

J. F. MYERS.
STOVE FOR HEATING AND LIGHTING PURPOSES.
No. 11,383. Reissued Nov. 7, 1893.
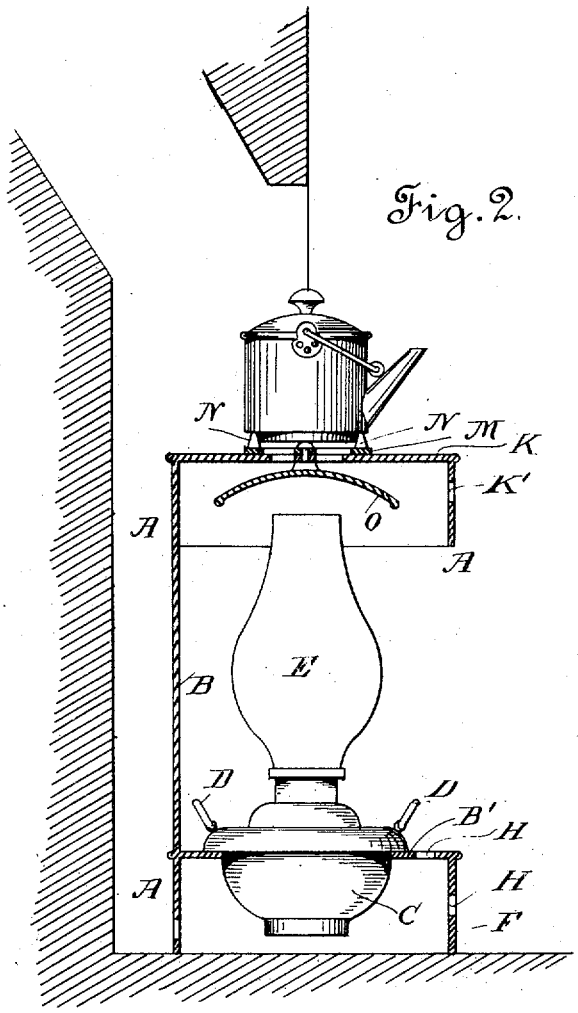
Witnesses.
F. Monteverde.
A. S. Paré
Inventor.
John F. Myers
by Jno. L. Boone
his Attorney
THE NORRIS PETERS CO., PHOTO-LITHO., WASHINGTON, D. C.

UNITED STATES PATENT OFFICE.

JOHN F. MYERS, OF SAN FRANCISCO, CALIFORNIA.

STOVE FOR HEATING AND LIGHTING PURPOSES.

SPECIFICATION forming part of Reissued Letters Patent No. 11,383, dated November 7, 1893.

Original No. 462,954, dated November 10, 1891. Application for reissue filed March 2, 1893. Serial No. 464,480.

*To all whom it may concern:*

Be it known that I, JOHN F. MYERS, a citizen of the United States, residing in the city and county of San Francisco, State of California, have invented an Improvement in Stoves for Heating and Lighting Purposes; and I hereby declare the following to be a full, clear, and exact description of the same.

My invention relates to an improved stove for heating and lighting purposes.

It consists in certain details of construction which will be more fully explained by reference to the accompanying drawings, in which—

Figure 1 is a perspective view of my stove in position in a fire-place. Fig. 2 is a sectional view of the same on the line *xx* of Fig. 1.

The object of my invention is to provide a device whereby I am enabled to use an ordinary coal-oil lamp within a grate or fire-place and by the employment of a peculiarly constructed inclosing casing to prevent the flame of the lamp from being affected by the usual strong draft of the chimney-flue.

It also has for its object a means for providing a proper circulation of air about the lower part of the lamp and oil-chamber without subjecting it to the chimney-draft, a means for concentrating the heat and projecting it into the room, and a means for opening communication with the chimney in order to discharge the odors arising when the lamp is extinguished and prevent their escaping into the room. A valve or damper is so arranged that the top may also be used for cooking purposes.

A is the casing, which in the present case I have shown as of a segmental or parabolic form in horizontal section, the axis being in a vertical line, and a corrugated or other reflecting-surface B is fitted around the inner surface. The exterior form of the back is such that it is adapted to fit into the fire-place after the basket and ash-pan have been removed; but the casing may be made in other forms without altering the character of my invention. B′ is a bottom of this casing, having a large opening through the center, into which the oil-reservoir of the lamp C is fitted. This reservoir is of large size and has the handles D upon each side, by which it may be conveniently taken out or replaced when necessary.

The burner may be of any well-known or suitable construction and has a glass chimney E extending up into the upper portion of the apparatus.

The bottom B is supported upon a base F, which has the rear portion approximating in shape to the rear of the curved body A. This base is of considerable depth, so as to allow the lamp-reservoir to be suspended within it without touching the surface upon which the apparatus stands, and I have shown the base mounted upon small wheels or rollers G, which allow it to be easily drawn out or pushed back into place. Through the front and top of this base are made a number of holes H, and through the top, in which the lamp-reservoir is suspended, the holes are made, so that air may readily draw through the openings in the base and thence up through these holes around the exterior of the lamp, thus producing a circulation of air within the body of the stove and around the reservoir and lamp to keep the parts cool, and especially to prevent overheating the reservoir by reason of its confinement within the casing. The cap or upper portion J is inclosed, as shown, and has a horizontal closed top K, with a number of small holes K′ in the front to allow the heat which rises into the upper portion of the casing from the lamp to pass out through these openings into the room.

This device is adapted to be fitted into the fire-place or opening for any grate by simply removing the basket and ash-pan therefrom, and it may be rolled into place upon the rollers G, so that any odors which may arise from the lamp when it is extinguished will escape through the valve or register L, which is partially opened for the purpose. The heat will be thrown out by direct radiation and by the action of the reflector behind the lamp, and the room will at the same time be lighted sufficiently for all ordinary purposes.

By the use of the casing closed behind and at the top the lamp is protected from the strong draft of the fire-place chimney. The open or perforated front and bottom supply air to keep the lamp cool. The closed top with perforations in front and the open front with reflector behind concentrate the heat and throw it out into the room, and at the same time protect the lamp from drafts, which would break the chimney or prevent perfect combustion.

In this class of lamp stoves the case or body section has heretofore been made to serve as a reflector by polishing the inner surface of the case, but this is objectionable, because any dent or injury to the case damages the reflector. In my stove, however, the reflector is separate and independent from the case, so that dents in the case will not affect the reflecting surface. It also permits one to use a plain case or back with a corrugated reflector, as represented at Fig. 1.

If it is desired to use the stove for cooking purposes, it is made available by the use of the damper or register L, which turns in a frame M, so as to close the openings in said frame or open them like the ordinary rotary register. The frame M has upwardly-projecting points N, which serve to support any vessel containing material which it is desired to heat or cook at this point.

When the device is to be used for cooking in this manner, it is simply drawn out from the fire-place sufficiently to expose the top and the register, which is opened for the purpose of cooking, as before described. When used for heating purposes, it is preferably allowed to stand within the fire-place, and by reason of the peculiar construction a great amount of heat is developed from it.

Below the register is suspended a concave or cup-shaped guard O, which, diverging above the lamp-chimney, will prevent any liquid spilled or boiled over the top of the cooking vessel from falling upon and breaking the chimney. By means of the register in the top I am also enabled to regulate the amount of heat without turning the lamp-wick down or extinguishing it entirely, for by opening the register much of the heat will be allowed to escape up the chimney. If the lamp is turned low, any odors arising from imperfect combustion will escape through the register and into the chimney.

Having thus described my invention, what I claim as new, and desire to secure by Letters Patent, is—

1. A stove consisting of a horizontal bottom supported above the floor level to allow free circulation of air beneath and having a central opening in said bottom, a removable lamp reservoir suspended in the opening and projecting below the bottom, perforations in the bottom around the reservoir, a segmental casing extending upward around the rear of the lamp, and an inclosed and perforated top, substantially as herein described.

2. A stove consisting of a horizontal bottom supported above the floor level to allow a free circulation of air beneath and having a central opening in the bottom, a removable lamp reservoir suspended in the opening, a segmental casing extending upward around the rear of the lamp, and an inclosed and perforated top, substantially as herein described.

3. The combination of a base, an open front casing extending upward from said base, a hood at the top of said casing provided with holes at its front, and a lamp supported on said base and provided with a chimney adapted to direct the current into said hood.

4. The combination of a base, an open front case extending upward from said base, a hood at the top of said case provided with holes at the front, and a lamp supported on said base and provided with a chimney extending into said hood.

5. The combination of a base, an open front case extending upward from said base, a hood at the top of said case and provided with holes at its front, a lamp supported on said base and provided with a chimney adapted to direct its current into said hood, and a reflector between said lamp and said case.

6. The combination of a base, an open front case extending upward from said base, a hood at the top of said case and provided with holes at the front, and an opening in its top, a lamp supported on said base and provided with a chimney adapted to direct its current into said hood.

In witness whereof I have hereunto set my hand.

JOHN F. MYERS.

Witnesses:
JAMES C. ADAMS,
ARTEMAS WEBSTER.